US012634818B2

(12) United States Patent
Li et al.

(10) Patent No.: US 12,634,818 B2
(45) Date of Patent: May 19, 2026

(54) TARGET WAKE-UP TIME ADJUSTING METHOD, EQUIPMENT, COMMUNICATION DEVICE, WIRELESS ACCESS POINT, TARGET WAKE-UP TIME ADJUSTING DEVICE, AND STORAGE MEDIUM

(71) Applicant: TP-LINK CORPORATION LIMITED, Hong Kong (CN)

(72) Inventors: Wanyi Li, Shenzhen (CN); Changqiang Wu, Shenzhen (CN)

(73) Assignee: TP-LINK CORPORATION LIMITED, Hong Kong (CN)

( * ) Notice: Subject to any disclaimer, the term of this patent is extended or adjusted under 35 U.S.C. 154(b) by 479 days.

(21) Appl. No.: 17/964,953

(22) Filed: Oct. 13, 2022

(65) Prior Publication Data

US 2023/0116526 A1 Apr. 13, 2023

(30) Foreign Application Priority Data

Oct. 13, 2021 (CN) .......................... 202111194166.8

(51) Int. Cl.
*H04W 52/02* (2009.01)
(52) U.S. Cl.
CPC ... *H04W 52/0216* (2013.01); *H04W 52/0229* (2013.01)
(58) Field of Classification Search
CPC ......... H04W 52/0216; H04W 52/0229; H04W 28/18; H04W 52/0248; Y02D 30/70
See application file for complete search history.

(56) References Cited

U.S. PATENT DOCUMENTS

2024/0349188 A1* 10/2024 Ahn ...................... G06F 1/3209

FOREIGN PATENT DOCUMENTS

| CN | 116158180 A | * | 5/2023 | ........... H04L 5/0048 |
| WO | 2018077186 A1 | | 5/2018 | |
| WO | 2020146094 A1 | | 7/2020 | |

* cited by examiner

*Primary Examiner* — Marcos L Torres
(74) *Attorney, Agent, or Firm* — Loeb & Loeb LLP

(57) ABSTRACT

The present disclosure discloses a target wake-up time adjusting method, equipment, communication device, wireless access point, target wake-up time adjusting device, and storage medium. The method includes: upon negotiating a TWT contract for the first time, receiving a target wake-up time transmitted by a wireless access point; acquiring a beacon message transmitted by the wireless access point; upon detecting that a communication device conducts data communication within a TWT service period with the wireless access point, acquiring a wake-up situation and a data interaction situation of the communication device in the data communication within current TWT service period; determining a number of wake-ups and a number of data interactions for the data communication within the TWT service period, according to the wake-up situation and the data interaction situation; adjusting the target wake-up time according to the parameter indication information, the number of wake-ups and the number of data interactions.

4 Claims, 2 Drawing Sheets a target wake-up time transmitted by the wireless access point is received, upon detecting that a communication device negotiates a TWT contract with a wireless access point for the first time    S1 a Beacon message transmitted by the wireless access point is acquired, wherein the Beacon message includes parameter indication information of a basic service set    S2 a wake-up situation and a data interaction situation of the communication device in current TWT interaction are acquired, upon detecting that the communication device conducts the TWT interaction with the wireless access point for one time    S3 a number of wake-ups and a number of data interactions for the TWT interaction that the communication device conducts with the wireless access point are determined, according to the wake-up situation and the data interaction situation    S4 the target wake-up time is adjusted according to the parameter indication information, the number of wake-ups and the number of data interactions, so as to apply the adjusted target wake-up time to the next TWT contract negotiation operation    S5

Fig. 1

| Element ID | Length | Element ID Extension | HE STA Count | Utilization | Frequency Underutilization | Spatial Stream Underutilization |
|---|---|---|---|---|---|---|

Octets:    1     1     1     2     1     1     1

Figure 9-787ac—HE BSS Load element format

Fig.2 target wake-up time adjusting equipment 10 target wake-up time receiving module — 11 message receiving module — 12 wake-up situation and data interaction situation acquiring module — 13 wake-up number and data interaction number determining module — 14 target wake-up time adjusting module — 15 target wake-up time adjusting device 20 processor — 21 memory — 22

TARGET WAKE-UP TIME ADJUSTING METHOD, EQUIPMENT, COMMUNICATION DEVICE, WIRELESS ACCESS POINT, TARGET WAKE-UP TIME ADJUSTING DEVICE, AND STORAGE MEDIUM

TECHNICAL FIELD

The present disclosure relates to a field of communication technology, in particular to a target wake-up time adjusting method, equipment, communication device, wireless access point, target wake-up time adjusting device, and storage medium.

BACKGROUND

TWT (Target wake times) technology is a mechanism newly added in IEEE Std 802.11ax protocol, which allows an STA (Station, client) to communicate with an AP (Wireless access point) intermittently, and allows the STA to be in the doze state for the rest of the time, thus optimizing energy consumption management for the STA, and enabling slow devices to no more occupy bandwidth for long. If the STA wants to join a TWT group of the AP or reach a TWT agreement with the AP, it is required to negotiate TWT parameter values, which determine the frequency and period of the STA's wake-ups. Generally speaking, the STA needs to propose a TWT value in a TWT request, whereas the AP would respond in a TWT response whether to accept this TWT value or whether to replace it with another value. At this time, the STA may determine whether it complies with the value given by the AP. If it does not want to comply, it is required to transmit another TWT Request to renegotiate. However, in IEEE Std 802.11ax protocol, how to formulate own TWT parameters for an STA to negotiate with AP is not specified, which is prone to cause an issue of uneven TWT period allocation, thus failing to fully utilize resources of the AP and STA.

SUMMARY

The purpose of the embodiments of the disclosure is to provide a target wake-up time adjusting method, equipment, communication device, wireless access point, target wake-up time adjusting device, and storage medium, enabling the communication device that wakes up periodically using adjusted target wake-up time parameters, to maximize utilization of resources of the wireless access point, reduce the energy consumption of self-wake-up, reduce contention collisions and optimize throughput.

To achieve the above purpose, the embodiments of the present disclosure provide a target wake-up time adjusting method, comprising: receiving a target wake-up time transmitted by a wireless access point, upon detecting that a communication device negotiates a TWT contract with the wireless access point for the first time; acquiring a beacon message transmitted by the wireless access point; wherein the beacon message includes parameter indication information of a basic service set; acquiring a wake-up situation and a data interaction situation of the communication device in data communication within current TWT service period, upon detecting that the communication device conducts the data communication with the wireless access point for one time within the TWT service period; determining a number of wake-ups and a number of data interactions for the data communication within the TWT service period that the communication device conducts with the wireless access point, according to the wake-up situation and the data interaction situation; wherein when the number of the data communications within TWT service periods that the communication device conducts with the wireless access point is greater than 2, the number of wake-ups and the number of data interactions are accumulated respectively in each of the data communications within TWT service periods; and adjusting the target wake-up time according to the parameter indication information, the number of wake-ups and the number of data interactions, so as to apply the adjusted target wake-up time to the next TWT contract negotiation operation.

As an improvement of the above solution, the parameter indication information includes utilization rate and underutilization rate; wherein the underutilization rate is frequency underutilization rate or space underutilization rate.

As an improvement of the above solution, the adjusting the target wake-up time according to the parameter indication information, the number of wake-ups, and the number of data interactions comprises: initially adjusting the target wake-up time according to the parameter indication information; wherein the utilization rate is used to adjust the target wake-up time with positive feedback, and the underutilization rate is used to adjust the target wake-up time with negative feedback; and readjusting the initially adjusted target wake-up time according to the number of wake-ups and the number of data interactions.

As an improvement of the above solution, the initially adjusting the target wake-up time according to the parameter indication information comprises: comparing the utilization rate with a preset reference value range of utilization rate to determine a first comparison result; comparing the underutilization rate with a preset reference value range of underutilization rate to determine a second comparison result; determining a corresponding first correction value according to the first comparison result and the second comparison result; and adding the first correction value to the target wake-up time.

As an improvement of the above solution, the readjusting the initially adjusted target wake-up time according to the number of wake-ups and the number of data interactions comprises: calculating a number ratio of the number of data interactions to the number of wake-ups; comparing the number ratio with several preset data sections to determine a target data section corresponding to the number ratio; wherein every data section corresponds to a second correction value; acquiring the second correction value corresponding to the target data section; adding the second correction value to the initially adjusted target wake-up time.

To achieve the above purpose, the embodiments of the present disclosure further provides a target wake-up time adjusting equipment, comprising: a target wake-up time receiving module for receiving a target wake-up time transmitted by a wireless access point upon detecting that a communication device negotiates a TWT contract with the wireless access point for the first time; a message receiving module for acquiring a beacon message transmitted by the wireless access point; wherein the beacon message includes parameter indication information of a basic service set; a wake-up situation and data interaction situation acquiring module for acquiring a wake-up situation and a data interaction situation of the communication device in data communication within current TWT service period upon detecting that the communication device conducts the data communication with the wireless access point for one time within the TWT service period; a wake-up number and data interaction number determining module for determining a number of wake-ups and a number of data interactions for the data communication within the TWT service period that the communication device conducts with the wireless access point according to the wake-up situation and the data interaction situation; wherein when the number of the data communications within TWT service periods that the communication device conducts with the wireless access point is greater than 2, the number of wake-ups and the number of data interactions are accumulated respectively in each of the data communications within TWT service periods; and a target wake-up time adjusting module for adjusting the target wake-up time according to the parameter indication information, the number of wake-ups and the number of data interactions so as to apply the adjusted target wake-up time to the next TWT contract negotiation operation.

As an improvement of the above solution, the parameter indication information includes utilization rate and under-utilization rate; wherein the underutilization rate is frequency underutilization rate or space underutilization rate.

As an improvement of the above solution, the target wake-up time adjusting module comprises: an initially adjusting unit for initially adjusting the target wake-up time according to the parameter indication information; a readjusting unit for readjusting the initially adjusted target wake-up time according to the number of wake-ups and the number of data interactions.

To achieve the above purpose, the embodiments of the present disclosure further disclose a target wake-up time adjusting device comprising a processor, a memory, and a computer program stored in the memory and configured to be executed by the processor, wherein the computer program, when being executed by the processor, implements the target wake-up time adjusting method as described in any of the above embodiments.

To achieve the above purpose, the embodiments of the present disclosure further disclose a computer-readable storage medium comprising a stored computer program, wherein the computer program, when being executed, controls the device where the computer-readable storage medium resides to perform the target wake-up time adjusting method as described in any of the above embodiments.

Correspondingly, to achieve the above purpose, the embodiments of the present disclosure further disclose a communication device comprising a receiver, a transmitter and one or more processors, wherein the receiver is configured to: receive a beacon message from a wireless access point, wherein the beacon message includes load-related parameters in a basic service set; the one or more processors are configured to: determine a target wake-up time for the next target wake-up time negotiation based at least in part on the load-related parameters; and determine a request for negotiating the next target wake-up time based on the target wake-up time for the next target wake-up time negotiation; the transmitter is configured to: transmit the request for negotiating the next target wake-up time to the wireless access point.

Correspondingly, to achieve the above purpose, the embodiments of the present disclosure further disclose a wireless access point comprising a receiver, a transmitter and one or more processors, wherein the transmitter is configured to transmit a beacon message to a communication device, wherein the beacon message includes load-related parameters in a basic service set; the receiver is configured to receive a request for negotiating the next target wake-up time from the communication device, the request for negotiating the next target wake-up time being associated with load-related parameters in the basic service set;

and the one or more processors are configured to determine a beacon message including a target wake-up time information element indicating when the communication device is woken up the next time based on the request for negotiating the next target wake-up time.

Correspondingly, to achieve the above purpose, the embodiments of the present disclosure further disclose a method for a communication device comprising: receiving a beacon message from a wireless access point, wherein the beacon message includes load-related parameters in a basic service set; determining a target wake-up time for the next target wake-up time negotiation based at least in part on the load-related parameters; and determining a request for negotiating the next target wake-up time based on the target wake-up time for the next target wake-up time negotiation; transmitting the request for negotiating the next target wake-up time to the wireless access point.

Correspondingly, to achieve the above purpose, the embodiments of the present disclosure further disclose a method for a wireless access point comprising: transmitting a beacon message to a communication device, wherein the beacon message includes load-related parameters in a basic service set; receiving a request for negotiating the next target wake-up time from the communication device, the request for negotiating the next target wake-up time being associated with load-related parameters in the basic service set; and determining a beacon message including a target wake-up time information element indicating when the communication device is woken up the next time based on the request for negotiating the next target wake-up time.

Compared with the prior art, in the target wake-up time adjusting method, equipment, device, and storage medium disclosed by the present disclosure: when the communication device negotiates TWT with the wireless access point for the first time, the communication device first uses the target wake-up time given by the wireless access point to conduct data communication within a TWT service period; parameter indication information with basic service set transmitted by the wireless access point is acquired, while the number of wake-ups and the number of data interactions when the communication device is conducting the data communication within the TWT service period are acquired, so that the target wake-up time is adjusted according to the parameter indication information, the number of wake-ups and the number of data interactions, to apply the adjusted target wake-up time to the next TWT contract negotiation operation. Since in the process of adjusting the target wake-up time, the influence of the load situation of the basic service set of the wireless access point is fully considered, then the target wake-up time is adjusted by combining a historical number of wake-ups and a historical number of data interactions for the communication device, so that the communication device that periodically wakes up using the adjusted target wake-up time parameter can maximize utilization of resources of the wireless access point, reduce the energy consumption of self-wake-up, reduce contention collisions and optimize throughput.

BRIEF DESCRIPTION OF DRAWINGS

FIG. 1 is a flowchart of a target wake-up time adjusting method provided by the embodiments of the present disclosure;

FIG. 2 is a format schematic diagram of a basic service set provided by the embodiments of the present disclosure;

DETAILED DESCRIPTION

Figure 3:
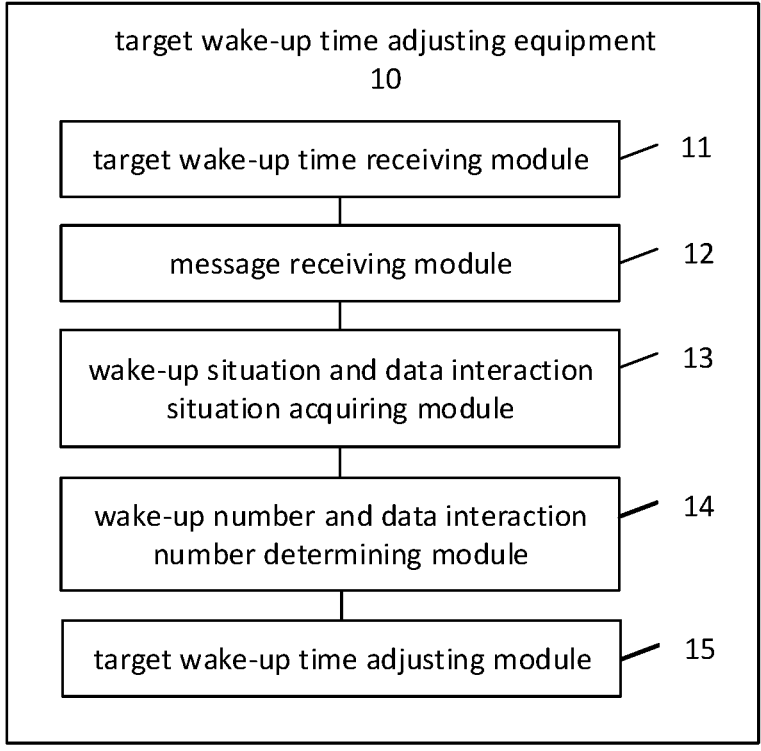
FIG. 3 is a structural schematic diagram of a target wake-up time adjusting equipment provided by the embodiments of the present disclosure.

The technical solutions in the embodiments of the present disclosure will be clearly and completely described below in conjunction with the accompanying drawings in the embodiments of the present disclosure. Obviously, the described embodiments are only part of the embodiments of the present disclosure, but not all of the embodiments. Based on the embodiments in the present disclosure, all other embodiments obtained by ordinary skilled in the art without making creative efforts belong to the protection scope of the present disclosure.

Referring to FIG. 1, FIG. 1 is a flowchart of a target wake-up time adjusting method provided by the embodiments of the present disclosure. The target wake-up time adjusting method comprises the following steps:

S1: a target wake-up time transmitted by the wireless access point is received, upon detecting that a communication device negotiates a TWT contract with a wireless access point for the first time.

S2: a beacon message transmitted by the wireless access point is acquired, wherein the beacon message includes parameter indication information of a basic service set.

S3: a wake-up situation and a data interaction situation of the communication device in data communication within current TWT service period (SP) are acquired, upon detecting that the communication device conducts the data communication with the wireless access point for one time within the TWT service period. In the present disclosure, the data communication within the TWT service period that the communication device conducts with the wireless access point for one time is also referred to as a TWT interaction. The process of data communication within a TWT service period includes, but is not limited to, all the processes of the data communication for negotiating TWT, the process of the data communication using the negotiated TWT, and so on. The present disclosure does not make limitations here.

S4: a number of wake-ups and a number of data interactions for the data communication within the TWT service period that the communication device conducts with the wireless access point are determined, according to the wake-up situation and the data interaction situation.

S5: the target wake-up time is adjusted according to the parameter indication information, the number of wake-ups, and the number of data interactions, so as to apply the adjusted target wake-up time to the next TWT contract negotiation operation.

It is worth noting that the target wake-up time adjusting method as described in the embodiments of the present disclosure can be implemented by a communication device, which is a client STA, such as a mobile phone, a computer and other clients.

Specifically, in Step S1, when the communication device negotiates a TWT contract with the wireless access point for the first time, it first uses the initial target wake-up time given by the wireless access point. At this time, the wireless access point gives a rule for the target wake-up time, which is not mandatory in the protocol, that is, each manufacturer can customize it when specifying a chip algorithm.

Specifically, in Step S2, the wireless access point would start broadcasting and transmitting a beacon message to the communication device at every Beacon interval period. The default period is 100 ms, and the period is adjustable. The function of the beacon message is to broadcast the load information of the basic service set BSS to the communication device so that the communication device acquires the information of the wireless access point through the beacon message. It is worth noting that the beacon message is different from the trigger frame transmitted by the wireless access point, and the function of the trigger frame is to transmit an uplink message to the communication device that has received the trigger frame.

Exemplarily, the beacon message format of the basic service set BSS may be referred to FIG. 2, in which: Element ID is the ID of Beacon message; Length is the length of Beacon message; Element ID Extension is the extension of the ID of Beacon message; HE STA Count is the number of associated communication devices; Utilization is the utilization rate, representing a proportion of time during which the wireless access point detects that the current channel is busy due to the transmission between the wireless access point and the communication device; Frequency Underutilization is the frequency underutilization rate, representing a proportion of time during which the wireless access point fails to fully utilize frequency domain resources due to busy channel in a certain period; Spatial Stream Underutilization is the space underutilization rate, representing a proportion of time during which the wireless access point fails to fully utilize spatial domain resources in a given busy channel time.

Specifically, the parameter indication information includes utilization rate (i.e., Utilization) and underutilization rate; wherein the underutilization rate is frequency underutilization rate (i.e., Frequency Underutilization) or space underutilization rate (i.e., Spatial Stream Underutilization). The communication device records the utilization rate, the frequency underutilization rate, and the space underutilization rate of each received Beacon message.

The utilization rate satisfies the following formula:

$$F_Q = \left| \frac{T_{busy}}{dot11ChannelUtilizationBeaconIntervals * dot11BeaconPeriod * 1024} * 255 \right|;$$

where $T_{busy}$ represents a number of microseconds in which the CCA indicates that the channel is busy due to the transmission between the wireless access point and the communication device during channel measurement; dot11ChannelUtilizationBeaconIntervals represents a number of consecutive beacon intervals over which the measurement would be conducted during channel busy time, and dot11BeaconPeriod represents an interval period during which the wireless access point transmits a beacon message.

The frequency underutilization rate satisfies the following formula:

$$F_U = \left| \frac{T_{busy} - \sum_{i=1}^{N} \left\{ \left( \sum_{j=1}^{N_{RU}} B_{j,i} * RU_j \right) * T_i \right\}}{T_{busy}} * 255 \right|;$$

where $F_U$ is the frequency underutilization rate; $T_i$ is the time interval in microseconds, and i represents the ith time interval during which the main 20 MHz channel is busy due to the transmission between the wireless access point and the communication device; N is the total number of busy channel events that occurred in a total channel measurement time; $N_{RU}$ is a number of RUs allocated within the basic service set BSS bandwidth in the time interval $T_i$; $RU_j$ is a normalization factor depending on RU size, which is equal to the ratio of the jth RU size to the maximum RU size within the basic service set BSS bandwidth; $B_{j,i}$ is 1, if the jth RU is occupied or interfered in time $T_i$, or it is 0 otherwise.

The space underutilization rate satisfies the following formula:

$$F_S = \left| \frac{N_{maxSS} * T_{busy} - \sum_{i=1}^{N} \left\{ \left( \sum_{j=1}^{N_{RUM}} N_{SS,j,i} * RUM_j \right) * T_i \right\}}{N_{maxSS} * T_{busy}} \right|;$$

where $F_S$ is the space underutilization rate; $N_{maxSS}$ represents a number of the maximum spatial streams supported by the wireless access point; $N_{RUM}$ is a number of RUs with a size of at least 106 Tones and allocated within the BSS bandwidth in a time interval $T_i$; $RUM_j$ is a normalization factor depending on RU size, RUM is applied to RUs with a size of at least 106 Tones, and is equal to a ratio of the jth RU size to the maximum RUM size within the BSS bandwidth, that is, if the jth RUM is 106 Tones and the BSS bandwidth is 20 MHz, $RUM_j$=106/242; $N_{SS,j,i}$ represents a number of streams on the jth RUM during the busy time $T_i$.

Specifically, in Step S3, when the communication device quits the first data communication within a TWT service period, it is required to record an average of the utilization rate, the frequency underutilization rate, and the space underutilization rate, respectively, and simultaneously record a wake-up situation and a data interaction situation in data communication within current TWT service period.

Exemplarily, the wireless access point may transmit the start time of the trigger frame to the communication device through TWT IE. The wireless access point may broadcast the whole service time of the broadcast mode to the communication device as a beacon. The communication device receives the beacon including the TWT Information element (IE). If the communication device finds its own information in the TWT IE, it wakes up at a fixed time to wait for the trigger frame. The TWT IE may include information representing a wake-up time, a doze time, or an interval between doze times, etc.

However, not all TWTs are trigger frame-based TWTs; if the TWT is a trigger frame-based TWT, the communication device will be woken up to wait for the wireless access point to transmit the trigger frame thereto (the wireless access point may not transmit the trigger frame, depending on whether the current wireless access point has already cached data); if the TWT is not a trigger frame based TWT, the communication device does not need to wait for the trigger frame after being woken up, and may directly transmit data or wait for the wireless access point to transmit data. Therefore, the communication device does not necessarily need to wait for the trigger frame after being woken up. The data interaction situation as described in the present disclosure may refer to the data interaction situation between the communication device and the wireless access point on the premise that the wireless access point has transmitted the trigger frame or the data interaction situation between the communication device and the wireless access point in the case that the wireless access point is not required to transmit the trigger frame.

Specifically, in Step S4, a number m of wake-ups and a number n of data interactions for the data communication within the TWT service period that the communication device conducts with the wireless access point are determined, according to the wake-up situation and the data interaction situation. Every time TWT is performed, the values of m and n are accumulated. The more TWT is performed, the larger the values of m and n are, thus the statistical significance is greater. Therefore, the recording of m and n may be started after the first TWT, and the values of m and n may be started as the basis for adjusting the target wake-up time after a certain number of times has been recorded.

Specifically, in Step S5, adjusting the target wake-up time according to the parameter indication information, the number of wake-ups, and the number of data interactions comprises steps S51~S52:

S51: the target wake-up time is initially adjusted according to the parameter indication information; wherein the utilization rate is used to adjust the target wake-up time with positive feedback, and the underutilization rate is used to adjust the target wake-up time with negative feedback;

S52: the initially adjusted target wake-up time is readjusted according to the number of wake-ups and the number of data interactions.

Exemplarily, because the communication device receives a beacon message every time it conducts a data communication within a TWT service period, and the beacon message carries the utilization rate and the underutilization rate, when only one Beacon message is received, the utilization rate and the underutilization rate may be directly utilized for subsequent calculation. When the received Beacon message is greater than 2, it is required to calculate an average of the utilization rate and the underutilization rate, and then to adjust the target wake-up time according to the average of the utilization rate and the underutilization rate. The smaller the utilization rate is, the greater the frequency underutilization rate (or space underutilization rate) is, indicating that the channel occupancy frequency is low at this time, or the utilized RUs (or the utilized space-time streams) are few, the interaction frequency may be appropriately increased at this time, that is, the target wake-up time may be reduced, and the variable value may be reduced at this time on the basis of the last target wake-up time, or vice versa.

In the disclosed embodiments, firstly, the target wake-up time is initially adjusted with the parameter indication information, and then, the target wake-up time is readjusted with the number of wake-ups and the number of data interactions of the communication device in historical statistics. The target wake-up time after performing adjustments two times may maximize the utilization of the resource of the wireless access point, reduce the energy consumption of self-wake-up, reduce contention collisions, and optimize throughput.

Specifically, in Step S51, initially adjusting the target wake-up time according to the parameter indication information comprises steps S511 to S514:

S511: the utilization rate is compared with a preset reference value range of utilization rate to determine a first comparison result;

S512: the underutilization rate is compared with a preset reference value range of the underutilization rate to determine a second comparison result;

S513: a corresponding first correction value is determined according to the first comparison result and the second comparison result;

S514: the first correction value is added to the target wake-up time.

Exemplarily, assuming that the upper limit of the deciding threshold for utilization rate is U1, and the lower limit of the deciding threshold is U2, then the reference value range of the utilization rate is [U2, U1]; the upper limit of the deciding threshold for underutilization rate is FU1, and the lower limit of the deciding threshold is FU2, then the reference value range of the underutilization rate is [FU2, FU1]. At this time, there are three types of first comparison results for the utilization rate, which are less than the lower limit, greater than the upper limit, and in the midrange, respectively; there are also three types of second comparison results for the underutilization rate, which are less than the lower limit, greater than the upper limit and in the midrange, respectively. The corresponding first correction value is determined according to the first comparison result and the second comparison result, whose specific values may be referred to Table 1. The first correction value in the table is unit, which is the wake-up interval of the target wake-up time. The longer the wake-up interval is, the lower the wake-up frequency of the communication device is. It is worth noting that the value of the first correction value in Table 1 is merely an example in the embodiments of the present disclosure. In actual situations, the user may customize the values for the first correction value, and any value that can revise the target wake-up time may be used as the first correction value, all of which are within the protection scope of the present disclosure.

TABLE 1

Values for First Correction Value

| Utilization Rate | Underutilization Rate | First Correction Value (unit) |
|---|---|---|
| less than lower limit | greater than upper limit | −3 |
| less than lower limit | midrange | −2 |
| less than lower limit | less than lower limit | −1 |
| midrange | greater than upper limit | −1 |
| midrange | midrange | 0 |
| midrange | less than lower limit | +1 |
| greater than upper limit | greater than upper limit | +1 |
| greater than upper limit | midrange | +2 |
| greater than upper limit | less than lower limit | +3 |

Specifically, in Step S52, readjusting the initially adjusted target wake-up time according to the number of wake-ups and the number of data interactions comprises steps S521~S524:

S521: the number ratio p of the number of data interactions n to the number of wake-ups m is calculated;

S522, the number ratio p is compared with several preset data sections to determine a target data section corresponding to the number ratio p; wherein every data section corresponds to a second correction value;

S523, the second correction value corresponding to the target data section is acquired;

S524. the second correction value is added to the initially adjusted target wake-up time.

Exemplarily, the number ratio p meets p=n/m*100%. When there is less data for the interaction between the communication device itself and the wireless access point, meaning that the communication device does not need to wake up too frequently, so the number of units is increased to achieve the purpose of increasing the target wake-up time. The data section may be [0,⅓], (⅓,⅔] and (⅔,1], and at this time, the values for the second correction value may be referred to Table 2. The second correction value in the table is unit, which is the wake-up interval of the target wake-up time. The longer the wake-up interval is, then the lower the wake-up frequency of the communication device is. It is worth noting that the data section and the values for the second correction value in Table 2 are merely an example in the embodiments of the present disclosure. In actual situations, the users may customize the data section and the values for the second correction value. Any value that can revise the target wake-up time may be used as the second correction value, and any section that the target wake-up time is revised may be used as the data section, all of which are within the protection scope of the present disclosure.

TABLE 2

Value for Second Correction Value

| Data Section | Second Correction Value (unit) |
|---|---|
| [0, ⅓] | +2 |
| (⅓, ⅔] | +1 |
| (⅔, 1] | 0 |

By ways of examples in conjunction with Table 1 and Table 2, assuming that at the target wake-up time T in the last data communication within a TWT service period, when the utilization rate is less than the lower limit and the underutilization rate is greater than the upper limit, the corresponding first correction value is −3, and the target wake-up time initially adjusted (T1) at Step S51 meets T1=T−3. Skipping to Step S52, where the number ratio p is within the data section [0,⅓], and the corresponding second correction value is +2 at this time, and the target wake-up time readjusted (T2) at Step S52 meets T2=T1+2=T−3+2=T−1.

In the target wake-up time adjusting method disclosed by the present disclosure: when the communication device negotiates TWT with the wireless access point for the first time, the communication device first uses the target wake-up time given by the wireless access point to conduct data communication within a TWT service period; parameter indication information with basic service set transmitted by the wireless access point is acquired, while the number of wake-ups and the number of data interactions when the communication device is conducting the data communication within the TWT service period are acquired, so that the target wake-up time is adjusted according to the parameter indication information, the number of wake-ups and the number of data interactions, to apply the adjusted target wake-up time to the next TWT contract negotiation operation. Since in the process of adjusting the target wake-up time, the influence of the load situation of the basic service set of the wireless access point is fully considered, then the target wake-up time is adjusted by combining a historical number of wake-ups and a historical number of data interactions for the communication device, so that the communication device that periodically wakes up using the adjusted target wake-up time parameter can maximize utilization of resources of the wireless access point, reduce the energy consumption of self-wake-up, reduce contention collisions and optimize throughput.

As such, the embodiments of the present disclosure further disclose a communication device comprising a receiver, a transmitter, and one or more processors, wherein the receiver is configured to: receive a beacon message from a wireless access point, wherein the beacon message includes load-related parameters in a basic service set; the one or more processors are configured to: determine a target wake-up time for the next target wake-up time negotiation based at least in part on the load-related parameters; and determine a request for negotiating the next target wake-up time based on the target wake-up time for the next target wake-up time negotiation; the transmitter is configured to: transmit the request for negotiating the next target wake-up time to the wireless access point.

Optionally, the above-described communication device is the above-described client STA, such as a mobile phone, a computer, and other clients. As described above, the load-related parameters in the basic service set include utilization rate and underutilization rate; wherein the underutilization rate is frequency underutilization rate or space underutilization rate, wherein the utilization is positively correlated with the target wake-up time for the next target wake-up time negotiation, and the underutilization rate is negatively correlated with the target wake-up time for the next target wake-up time negotiation. The beacon message including the load-related parameters in the basic service set has been described in detail with reference to FIG. 2, and the present disclosure omits the description thereof.

Optionally, as described above, the determining a target wake-up time for the next target wake-up time negotiation based at least in part on the load-related parameters further comprises: comparing the utilization rate with a preset reference value range of utilization rate to determine a first comparison result; comparing the underutilization rate with a preset reference value range of underutilization rate to determine a second comparison result; and determining the target wake-up time for the next target wake-up time negotiation based at least in part on the first comparison result and the second comparison result. The related adjustment process has been described in detail with reference to Table 1 and Step S51, and the present disclosure omits the description thereof.

Optionally, as described above, the receiver is further configured to receive a message including an initial target wake-up time from the wireless access point; and the determining a target wake-up time for the next target wake-up time negotiation based at least in part on the load-related parameters further comprises: determining the target wake-up time for the next target wake-up time negotiation based at least in part on the load-related parameters and the initial target wake-up time.

Optionally, the receiver is further configured to receive a beacon message including a target wake-up time information element indicating a wake-up time, a doze time or an interval between doze times of the communication device; and the determining a target wake-up time for the next target wake-up time negotiation based at least in part on the load-related parameters further comprises: determining whether the communication device is woken up and whether the communication device conducts a data interaction with the wireless access point based at least in part on the target wake-up time information element; determining a wake-up situation or data interaction situation corresponding to the target wake-up time information element based on whether the communication device is woken up and whether the communication device conducts a data interaction with the wireless access point; and determining the target wake-up time for the next target wake-up time negotiation based at least in part on the load-related parameters and the wake-up situation or data interaction situation corresponding to the target wake-up time information element. Of course, the present disclosure is not limited to this.

For example, the target wake-up time information element is the above-described TWT information element (IE), which includes the information of the communication device (such as the identifier or MAC address of the communication device), and the communication device determines whether it needs to be woken up according to the wake-up time indicated in the TWT information element.

If the TWT information element indicates that the data communication within the TWT service period process corresponding to the TWT information element is not a data communication process within a TWT service period based on a trigger frame, the communication device will determine whether it is required to interact with the wireless access point according to whether it has cached data to be transmitted after being woken up. If the communication device determines that it needs to be woken up and it is required to interact with the wireless access point, the number of wake-ups m and the number of data interactions n will be accumulated.

If the TWT information element indicates that the data communication within the TWT service period process corresponding to the TWT information element is a data communication process within a TWT service period based on a trigger frame, the communication device waits for the trigger frame after being woken up, and determines whether it is required to interact with the wireless access point based on the trigger frame. That is, the receiver is further configured to receive a trigger frame after receiving the beacon message including the target wake-up time information element; and the determining whether the communication device is woken up and whether the communication device conducts a data interaction with the wireless access point based at least in part on the target wake-up time information element further comprises: determining whether the communication device conducts a data interaction with the wireless access point based on the trigger frame. If the communication device determines that it needs to be woken up and it is required to interact with the wireless access point, the number of wake-ups m and the number of data interactions n will be accumulated.

Therefore, optionally, the determining a target wake-up time for the next target wake-up time negotiation based at least in part on the load-related parameters further comprises: determining a number of the wake-ups for the communication device from the initial target wake-up time to the current time and a number of the data interactions that the communication device conducts with the wireless access point; determining a historical wake-up situation or historical data interaction situation of the communication device based on the number of the wake-ups for the communication device and the number of the data interactions that the communication device conducts with the wireless access point; determining the target wake-up time for the next target wake-up time negotiation based at least in part on the load-related parameters and the historical wake-up situation or historical data interaction situation.

Correspondingly, to achieve the above purpose, the embodiments of the present disclosure further disclose a method for a communication device comprising: receiving a beacon message from a wireless access point, wherein the beacon message includes load-related parameters in a basic service set; determining a target wake-up time for the next target wake-up time negotiation based at least in part on the load-related parameters; and determining a request for negotiating the next target wake-up time based on the target wake-up time for the next target wake-up time negotiation; transmitting the request for negotiating the next target wake-up time to the wireless access point.

Furthermore, the embodiments of the present disclosure further disclose a wireless access point comprising a receiver, a transmitter and one or more processors, wherein the transmitter is configured to transmit a beacon message to a communication device, wherein the beacon message includes load-related parameters in a basic service set; the receiver is configured to receive a request for negotiating the next target wake-up time from the communication device, the request for negotiating the next target wake-up time being associated with load-related parameters in the basic service set; and the one or more processors are configured to determine a beacon message including a target wake-up time information element indicating when the communication device is woken up the next time based on the request for negotiating the next target wake-up time. Of course, the present disclosure is not limited to this.

Optionally, the load-related parameters in the basic service set include utilization rate and underutilization rate; wherein the underutilization rate is frequency underutilization rate or space underutilization rate, wherein the utilization is positively correlated with the target wake-up time for the next target wake-up time negotiation, and the underutilization rate is negatively correlated with the target wake-up time for the next target wake-up time negotiation. Of course, the present disclosure is not limited to this.

Optionally, the transmitter of the wireless access point is further configured to: transmit a message including an initial target wake-up time to the communication device; and transmit a trigger frame to the communication device after the initial target wake-up time. And the receiver is further configured to receive uplink data based on the trigger frame from the communication device. Of course, the present disclosure is not limited to this.

Optionally, the transmitter of the wireless access point is further configured to: transmit a beacon message including a target wake-up time information element to the communication device, the target wake-up time information element indicating a wake-up time, a doze time or an interval between doze times of the communication device; and wherein the request for negotiating the next target wake-up time is associated with the target wake-up time information element. Of course, the present disclosure is not limited to this.

Optionally, the request for negotiating the next target wake-up time is associated with a number of the wake-ups for the communication device from the initial target wake-up time to the current time and a number of the data interactions that the communication device conducts with the wireless access point. Of course, the present disclosure is not limited to this.

Correspondingly, the embodiments of the present disclosure further disclose a method for a wireless access point comprising: transmitting a beacon message to a communication device, wherein the beacon message includes load-related parameters in a basic service set; receiving a request for negotiating the next target wake-up time from the communication device, the request for negotiating the next target wake-up time being associated with load-related parameters in the basic service set; and determining a beacon message including a target wake-up time information element indicating when the communication device is woken up the next time based on the request for negotiating the next target wake-up time. Of course, the present disclosure is not limited to this.

Referring to FIG. 3, FIG. 3 is a structural schematic diagram of a target wake-up time adjusting equipment 10 provided by the embodiments of the present disclosure. The target wake-up time adjusting equipment 10 comprises: a target wake-up time receiving module 11 for receiving a target wake-up time transmitted by a wireless access point upon detecting that a communication device negotiates a TWT contract with the wireless access point for the first time; a message receiving module 12 for acquiring a beacon message transmitted by the wireless access point; wherein the beacon message includes parameter indication information of a basic service set; a wake-up situation and data interaction situation acquiring module 13 for acquiring a wake-up situation and a data interaction situation of the communication device in data communication within current TWT service period upon detecting that the communication device conducts the data communication with the wireless access point for one time within the TWT service period; a wake-up number and data interaction number determining module 14 for determining a number of wake-ups and a number of data interactions for the data communication within the TWT service period that the communication device conducts with the wireless access point according to the wake-up situation and the data interaction situation; wherein when the number of the data communications within TWT service periods that the communication device conducts with the wireless access point is greater than 2, the number of wake-ups and the number of data interactions are accumulated respectively in each of the data communications within TWT service periods; and a target wake-up time adjusting module 15 for adjusting the target wake-up time according to the parameter indication information, the number of wake-ups and the number of data interactions so as to apply the adjusted target wake-up time to the next TWT contract negotiation operation.

Optionally, the parameter indication information includes utilization rate and underutilization rate; wherein the underutilization rate is frequency underutilization rate or space underutilization rate.

Optionally, the target wake-up time adjusting module comprises: an initially adjusting unit for initially adjusting the target wake-up time according to the parameter indication information; a re-adjusting unit for readjusting the initially adjusted target wake-up time according to the number of wake-ups and the number of data interactions.

Optionally, the initially adjusting unit is used to: compare the utilization rate with a preset reference value range of utilization rate to determine a first comparison result; compare the underutilization rate with a preset reference value range of underutilization rate to determine a second comparison result; determine a corresponding first correction value according to the first comparison result and the second comparison result; and add the first correction value to the target wake-up time Optionally, the re-adjusting unit is used to: calculate a number ratio of the number of data interactions to the number of wake-ups; compare the number ratio with several preset data sections to determine a target data section corresponding to the number ratio; wherein every data section corresponds to a second correction value; acquire the second correction value corresponding to the target data section; add the second correction value to the initially adjusted target wake-up time.

It is worth noting that the working process of each module in the target wake-up time adjusting equipment 10 as described in the embodiments of the present disclosure can refer to the working process of the target wake-up time adjusting method as described in the above embodiments, and the description thereof is omitted here.

Compared with the prior art, in the target wake-up time adjusting equipment 10 disclosed by the present disclosure: when the communication device negotiates TWT with the wireless access point for the first time, the communication device first uses the target wake-up time given by the wireless access point to conduct data communication within a TWT service period; parameter indication information with basic service set transmitted by the wireless access point is acquired, while the number of wake-ups and the number of data interactions when the communication device is conducting the data communication within the TWT service period are acquired, so that the target wake-up time is adjusted according to the parameter indication information, the number of wake-ups and the number of data interactions, to apply the adjusted target wake-up time to the next TWT contract negotiation operation. Since in the process of adjusting the target wake-up time, the influence of the load situation of the basic service set of the wireless access point is fully considered, then the target wake-up time is adjusted by combining a historical number of wake-ups and a historical number of data interactions for the communication device, so that the communication device that periodically wakes up using the adjusted target wake-up time parameter can maximize utilization of resources of the wireless access point, reduce energy consumption of self-wake-up, reduce contention collisions and optimize throughput.

Figure 4:
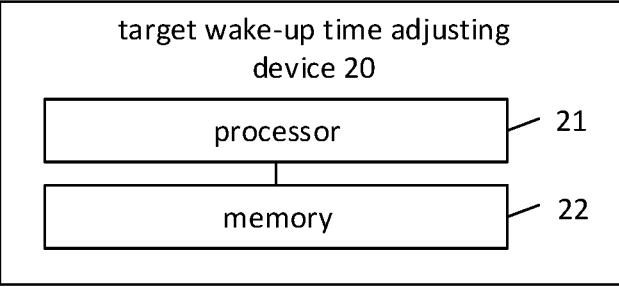
FIG. 4 is a structural schematic diagram of a target wake-up time adjusting device provided by the embodiments of the present disclosure.

Referring to FIG. 4, FIG. 4 is a structural schematic diagram of a target wake-up time adjusting device 20 provided by the embodiments of the present disclosure, and the target wake-up time adjusting device 20 comprises a processor 21, a memory 22, and a computer program stored in the memory 22 and executable on the processor 21. The computer program, when being executed by the processor 21, implements steps in each embodiment of the above-described target wake-up time adjusting method. Or, the computer program, when being executed by the processor 21, implements functions of each module/unit in each above-described equipment embodiment.

Exemplarily, the computer program may be divided into one or more modules/units, which are stored in the memory 22 and executed by the processor 21 to complete the present disclosure. The one or more modules/units may be a series of computer program instruction segments capable of performing specific functions, which are used to describe the execution process of the computer program in the target wake-up time adjusting device 20.

The target wake-up time adjusting device 20 may be a computing device such as a desktop computer, a notebook computer, a PDA, a cloud server, etc. The target wake-up time adjusting device 20 may include, but is not limited to, a processor 21 and a memory 22. It can be understood by those skilled in the art that the schematic diagram is merely an example of the target wake-up time adjusting device 20, but does not constitute a limitation on the target wake-up time adjusting device 20, and may include more or less components than those shown, or some combined components, or different components. For example, the target wake-up time adjusting device 20 may also include input and output devices, network access devices, buses, etc.

The processor 21 may be a Central Processing Unit (CPU), or may be another general-purpose processor, Digital Signal Processor (DSP), Application Specific Integrated Circuit (ASIC), Field-Programmable Gate Array (FPGA) or other programmable logic device, discrete gate or transistor logic device, discrete hardware component, etc. The general-purpose processor may be a microprocessor or the processor may be any conventional processor, etc. The processor 21 is the control center of the target wake-up time adjusting device 20, and various parts of the whole target wake-up time adjusting device 20 are connected by various interfaces and lines.

The memory 22 may be used to store the computer programs and/or modules, and the processor 21 implements various functions of the target wake-up time adjusting device 20 by running or executing the computer programs and/or modules stored in the memory 22 and invoking the data stored in the memory 22. The memory 22 may mainly include a program storage area and a data storage area, wherein the program storage area may store an operating system, application programs required by at least one function (such as sound playing function, image playing function, etc.), and the like; the data storage area may store data created according to the use of the mobile phone (such as audio data, phone book, etc.), and the like. In addition, the memory 22 may include an express random access memory, and may include a nonvolatile memory, such as a hard disk, a memory, a plug-in hard disk, a Smart Media Card (SMC), a Secure Digital (SD) card, a Flash Card, at least one disk memory device, a flash memory device, or other volatile solid-state memory devices.

In the embodiments, the modules/units integrated in the target wake-up time adjusting device 20 may be stored in a computer-readable storage medium if they are implemented in the form of software functional unit and sold or used as independent products. Based on such understanding, the present disclosure may implement all or part of the flows in the above example method, by instructing related hardware through a computer program, which may be stored in a computer-readable storage medium, and the computer program, when being executed by the processor 21, implements steps of the above various method embodiments. In the embodiments, the computer program includes computer program code, which may be in the form of source code, the form of object code, executable file or some intermediate form. The computer-readable medium may include any entity or equipment capable of carrying the computer program code, recording medium, U disk, removable hard disk, magnetic disk, optical disk, computer memory, Read-Only Memory (ROM), Random Access Memory (RAM), electrical carrier signal, telecommunication signal, and software distribution medium, etc. It should be noted that the contents included in the computer-readable medium may be appropriately increased or decreased according to the requirements of legislation and patent practice in jurisdictions. For example, in some jurisdictions, according to legislation and patent practice, a computer-readable medium does not include electrical carrier signals and telecommunication signals.

It should be noted that the above-described equipment embodiments are merely schematic, where the units illustrated as separate components may be or may not be physically separated, and the components displayed as units may be or may not be physical units, that is, they may be located in one place or distributed over multiple network units. Some or all of the modules may be selected as required to achieve the purpose of this embodiment solution. In addition, in the drawings of the device embodiment provided by the present disclosure, the connection relationship between modules means that they have communication connection, which may be specifically implemented as one or more communication buses or signal lines. The ordinary skilled in the art may understand and implement it without creative efforts.

The above are the preferred embodiments of the present disclosure. It should be pointed out that for those ordinary skilled in the art, several improvements and embellishments may be made without departing from the principles of the present disclosure, and these improvements and embellishments are also regarded as the protection scope of the present disclosure.

What is claimed is:

1. A wireless access point comprising a receiver, a transmitter, and one or more processors, wherein, the transmitter is configured to transmit a beacon message to a communication device, wherein the beacon message includes load-related parameters in a basic service set, and the load-related parameters in the basic service set include utilization rate and underutilization rate;

wherein the underutilization rate comprises frequency underutilization rate or spatial stream underutilization rate, the transmitter is further configured to calculate the frequency underutilization rate or the spatial stream underutilization rate based on a number of microseconds in which the channel is busy due to the transmission between the wireless access point and the communication device;

the receiver is configured to receive a request for negotiating the next target wake-up time from the communication device, the request for negotiating the next target wake-up time being associated with load-related parameters in the basic service set; and the one or more processors are configured to determine a beacon message including a target wake-up time information element indicating when the communication device is woken up the next time based on the request for negotiating the next target wake-up time.

2. The wireless access point of claim 1, wherein, the transmitter is further configured to:

transmit a message including an initial target wake-up time to the communication device; and transmit a trigger frame to the communication device after the initial target wake-up time; and the receiver is further configured to receive uplink data based on the trigger frame from the communication device.

3. The wireless access point of claim 1, wherein, the transmitter is further configured to transmit a beacon message including a target wake-up time information element to the communication device, the target wake-up time information element indicating a wake-up time, a doze time or an interval between doze times of the communication device; and wherein the request for negotiating the next target wake-up time is associated with the target wake-up time information element.

4. The wireless access point of claim 2, wherein the request for negotiating the next target wake-up time is associated with a number of the wake-ups for the communication device from the initial target wake-up time to the current time and a number of the data interactions that the communication device conducts with the wireless access point.

* * * * *